(12) United States Patent
Sugaya

(10) Patent No.: US 9,923,864 B2
(45) Date of Patent: Mar. 20, 2018

(54) INFORMATION PROCESS DEVICE, INFORMATION PROCESS METHOD AND PROGRAM FOR EXECUTING INFORMATION PROCESS DEVICE

(71) Applicant: OPTiM Corporation, Saga (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 197 days.

(21) Appl. No.: 14/788,906

(22) Filed: Jul. 1, 2015

(65) Prior Publication Data
US 2016/0261552 A1 Sep. 8, 2016

(30) Foreign Application Priority Data

Mar. 2, 2015 (JP) ................. 2015-040155

(51) Int. Cl.
*G06F 15/16* (2006.01)
*H04L 29/12* (2006.01)
*H04L 12/751* (2013.01)

(52) U.S. Cl.
CPC .......... *H04L 61/10* (2013.01); *H04L 61/2007* (2013.01); *H04L 45/02* (2013.01); *H04L 61/103* (2013.01)

(58) Field of Classification Search
CPC ... H04L 12/2803–12/282; H04L 45/00–45/02; H04L 61/10–61/2023
See application file for complete search history.

(56) References Cited

U.S. PATENT DOCUMENTS

| | | | | |
|---|---|---|---|---|
| 7,096,273 B1* | 8/2006 | Meier | ............... | H04L 29/12235 709/222 |
| 2004/0043791 A1* | 3/2004 | Reddy | ............... | H04L 29/12009 455/558 |
| 2004/0213260 A1* | 10/2004 | Leung | ............... | H04L 29/12311 370/395.3 |
| 2007/0239860 A1* | 10/2007 | Shirai | ............... | H04L 29/12264 709/221 |
| 2011/0013591 A1* | 1/2011 | Kakumaru | ........ | H04W 36/0016 370/331 |

FOREIGN PATENT DOCUMENTS

JP 2015-029198 2/2015

* cited by examiner

*Primary Examiner* — Brendan Higa
(74) *Attorney, Agent, or Firm* — Lex IP Meister, PLLC

(57) ABSTRACT

In order to attain the above object, an information process device of the present invention detects a connection of an electric appliance 100 to a network, transmits an IP address of the electric appliance 100, acquires the IP address of the detected electric appliance 100, acquires association information associating the IP address with an identifier identifying the electric appliance 100, re-acquires the IP address of the re-detected electric appliance based on the acquired association information, and redirects a connection request from an IP address associated with the identifier to the re-acquired IP address based on the acquired association information.

6 Claims, 5 Drawing Sheets

Fig. 4

FIRST ASSOCIATION TABLE

| PSEUDO IP ADDRESS | PRESENT IP ADDRESS | MAC ADDRESS | UNIQUE ID |
|---|---|---|---|
| 192.168.1.4 | 192.168.1.4 | 33:55:0a:99:0b | XXXX ELECTRIC APPLIANCE |

Fig. 5

SECOND ASSOCIATION TABLE

| PSEUDO IP ADDRESS | PRESENT IP ADDRESS | MAC IP ADDRESS | UNIQUE ID |
|---|---|---|---|
| 192.168.1.4 | 192.168.1.8 | 33:55:0a:99:0b | XXXX ELECTRIC APPLIANCE |

INFORMATION PROCESS DEVICE, INFORMATION PROCESS METHOD AND PROGRAM FOR EXECUTING INFORMATION PROCESS DEVICE

TECHNICAL FIELD

The present invention relates to an information process device executing a predetermined process corresponding to an electric appliance connected to a network, an information process method and a program for executing the information process device.

BACKGROUND ART

In recent years, DHCP (Dynamic Host Configuration Protocol) has been used to assign an IP address to an electric appliance connected with a network.

DHCP automatically assigns the electric appliance an IP address when the electric appliance is connected to a network.

Furthermore, as disclosed in Patent Document 1, a user can select and use the previous IP address by associating and storing a MAC address of an electric appliance with a predetermined IP address when an electric appliance is connected or even when re-connected with a network.

CITATION LIST

Patent Literature

Patent Document 1: JP 2015-029198A

SUMMARY OF INVENTION

However, since the IP address assigned by DHCP has a TTL (Time to live), another IP address may be assigned after a certain period of time or in case of re-connection after a disconnection. As a result, when the IP address is stored in an electric appliance, it is necessary for a user and the administrators of the system to redirect the IP address by themselves. Thus a network configuration is not easy and user-friendly.

Furthermore, even in the case of the network configuration described in Patent Document 1, a user and the administrators of the system must redirect the IP address to be used from the stored IP address to the assigned IP address. Thus the network configuration is not easy and the system's user-friendliness is poor similarly.

The object of the present invention is to provide an information process device, an information process method and a program executed by the information process device to enable easy and user-friendly network configuration.

According to the first aspect of the invention, an information process device executing predetermined process in response to connection of an electric appliance with a network, includes:

an electric appliance detecting module detecting connection of the electric appliance to a network;

an IP address acquiring module acquiring the IP address of the detected electric appliance;

an associated information acquiring module acquiring association information associating the IP address with an identifier identifying the electric appliance;

an electric appliance re-detecting module re-detecting connection of the electric appliance to the network;

an IP address re-acquiring module re-acquiring the IP address of the re-detected electric appliance; and a connection request redirecting module redirecting a connection request from an IP address associated with the identifier to the re-acquired IP address based on the acquired association information.

According to the first aspect of the invention, an information process device executing predetermined process in response to connection of an electric appliance with a network, detects connection of the electric appliance to a network, acquires the IP address of the detected electric appliance, acquires association information associating the IP address with an identifier identifying the electric appliance, re-detects connection of the electric appliance to the network, re-acquires the IP address of the re-detected electric appliance, and redirects a connection request from an IP address associated with the identifier to the re-acquired IP address based on the acquired association information.

Consequently, in case that an electric appliance is re-connected to a network, a network configuration becomes easier and more user-friendly by redirecting the connection request for the IP address connected in the first place to the re-connected IP address.

According to the first aspect of the invention, this belongs to the category of an information process device but has the same working effects under different categories such as information process method.

According to the second aspect of the invention, in the information process device according to the first aspect, the association information acquiring module acquiring association information associating an identifier of the electric appliance with an IP address acquired by the IP address acquiring module as a pseudo IP address and an IP address re-acquired by the IP address re-acquiring module as a present IP address.

According to the second aspect of the invention, the information process device according to the first aspect of the invention acquires association information associating an identifier of the electric appliance with an IP address acquired by the IP address acquiring module as a pseudo IP address and an IP address re-acquired by the IP address re-acquiring module as a present IP address.

According to the third aspect of the present invention, in the information process device according to the first or second aspect of the invention, the identifier acquired by the association information acquiring module is a MAC address.

According to the third aspect of the invention, in the information process device according to the first or second aspect of the invention, the identifier acquired by the association information acquiring module is a MAC address.

According to the fourth aspect of the invention, in the information process device according to any one of the first to the third aspect of the invention, the identifier acquired by the association information acquiring module is a unique ID arbitrarily assigned by a user.

According to the invention relating to the fourth aspect, in information process device according to any one of the first to the third aspects, the identifier acquired by the association information acquiring module is a unique ID arbitrarily assigned by a user.

According to the fifth aspect of the invention,

The information process method of executing a predetermined process in response to connection of an electric appliance with a network, includes the steps of:

detecting connection of the electric appliance to a network;

acquiring the IP address of the detected electric appliance;

acquiring association information associating the IP address with an identifier identifying the electric appliance;

re-detecting connection of the electric appliance to a network;

re-acquiring a re-detected IP address of the re-detected electric appliance; and redirecting a connection request from an IP address associated with the identifier association to the re-acquired IP address based on the acquired association information.

According to the sixth aspect of the invention,

The program product for use in an information process device includes a non-transitory computer usable medium having a set of instructions physically embodied therein, the set of instructions including computer readable code, which when executed by the information process device executing predetermined process in response to a connection of the electric appliance with a network causes the information process unit to:

detect connection of the electric appliance to a network;

acquire the IP address of the detected electric appliance;

acquire association information associating the IP address with an identifier identifying the electric appliance;

re-detect connection of the electric appliance to the network;

re-acquire the IP address of the re-detected electric appliance;

redirect a connection request from an IP address associated with the identifier association to the re-acquired IP address based on the acquired association information.

According to the invention of the present application, an information process device, an information process method and a program for execution of information process device enabling an easy network configuration and enhancing the user-friendliness is provided.

BRIEF DESCRIPTION OF DRAWINGS

FIG. 4 is the first association table stored in the information process device 10.

FIG. 5 is the second association table stored in the information process device 10.

DESCRIPTION OF EMBODIMENTS

Hereinafter, a preferable mode of the present invention will be described with reference to the accompanying drawings. However this is illustrative only, and the scope of the present invention is not limited thereto.

System Configuration of Information Process System 1

Figure 1:
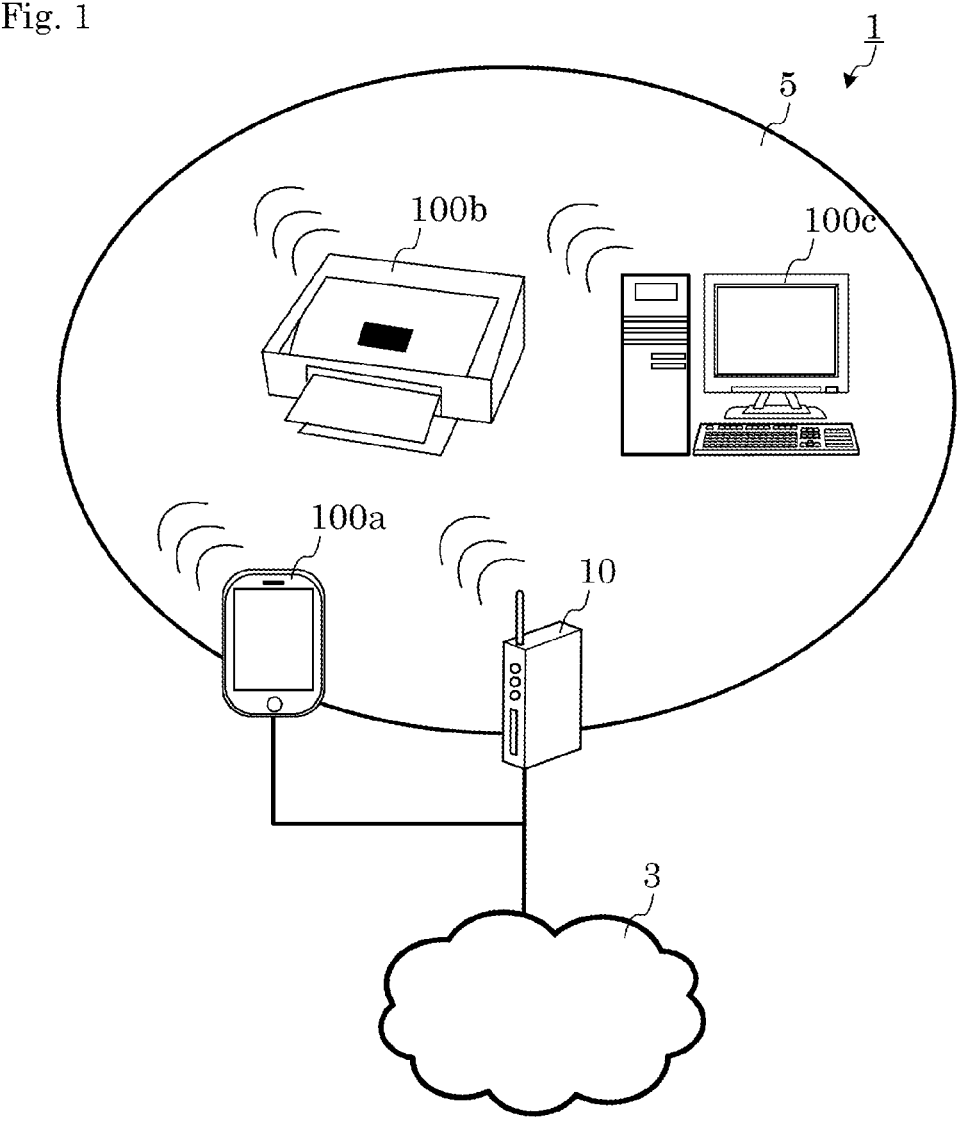
FIG. 1 is a diagram showing an overall configuration of an information process system 1.

FIG. 1 is a diagram showing a system configuration of the information process system 1 according to one preferred embodiment of the present invention. The information process system 1 includes: an information process device; an electric appliances 100 a, b, c (hereinafter referred to as simply 100 unless otherwise expressly provided); and a public telephone line network 3 (the Internet network, a third generation network, a fourth generation network, etc.).

The information process device 10 is connected to the electric appliances 100 via the public telephone line network 3 or a local area network (LAN) 5. The information process system may be formed through wireless or wired connection. The information process device 10 is a network device to connect with the public telephone line network 3, such as a router and a gateway.

The electric appliance 100 is a home or business electric appliance capable of data communication, including not only home information appliances such as a personal computer 100c, a television, a telephone, a computer, a mobile phone 100a, a personal digital assistant, a netbook computer, a slate device, an electronic book terminal, a portable music player, an audio device, a content record player, a printer 100b, a facsimile, a photocopier, a scanner, and an MFP (a multi-function peripheral, a multi-function printer, etc.), but also white goods such as a refrigerator, a washing machine, a dishwasher and dryer, an electric fan, an air-conditioner, an electric heater, a rice-cooker, and a microwave oven, a lighting device, a server computer, a router, a gateway, and an NAS (network attached storage).

Functions

Figure 2:
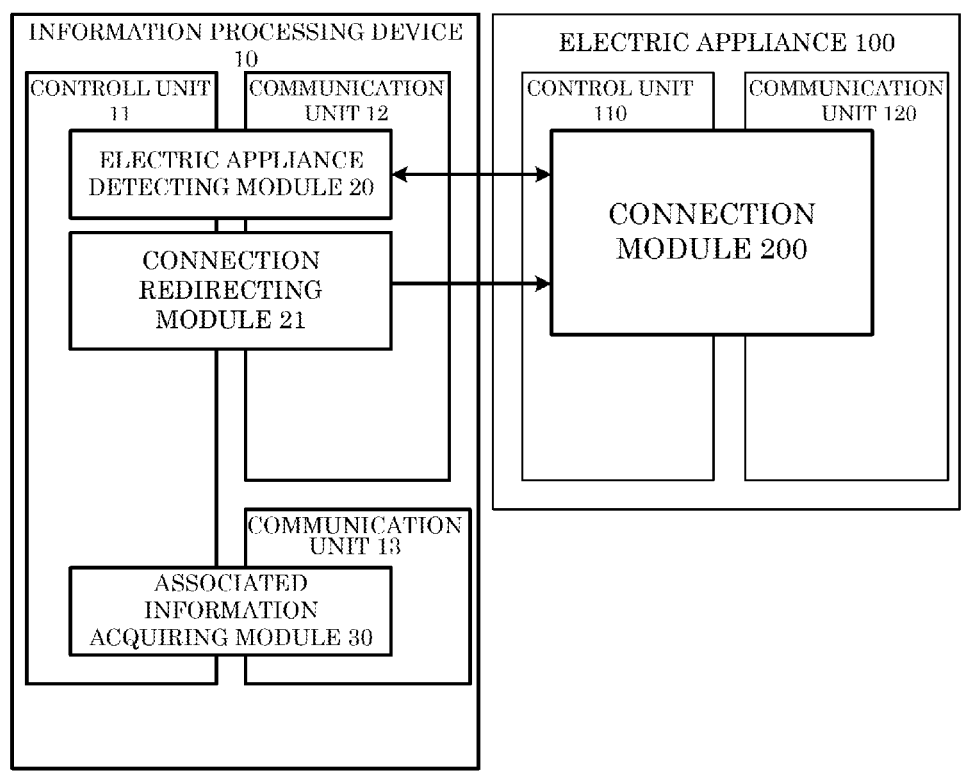
FIG. 2 is a functional block diagram of the information process device 10 and the electric appliance 100.
Figure 3:
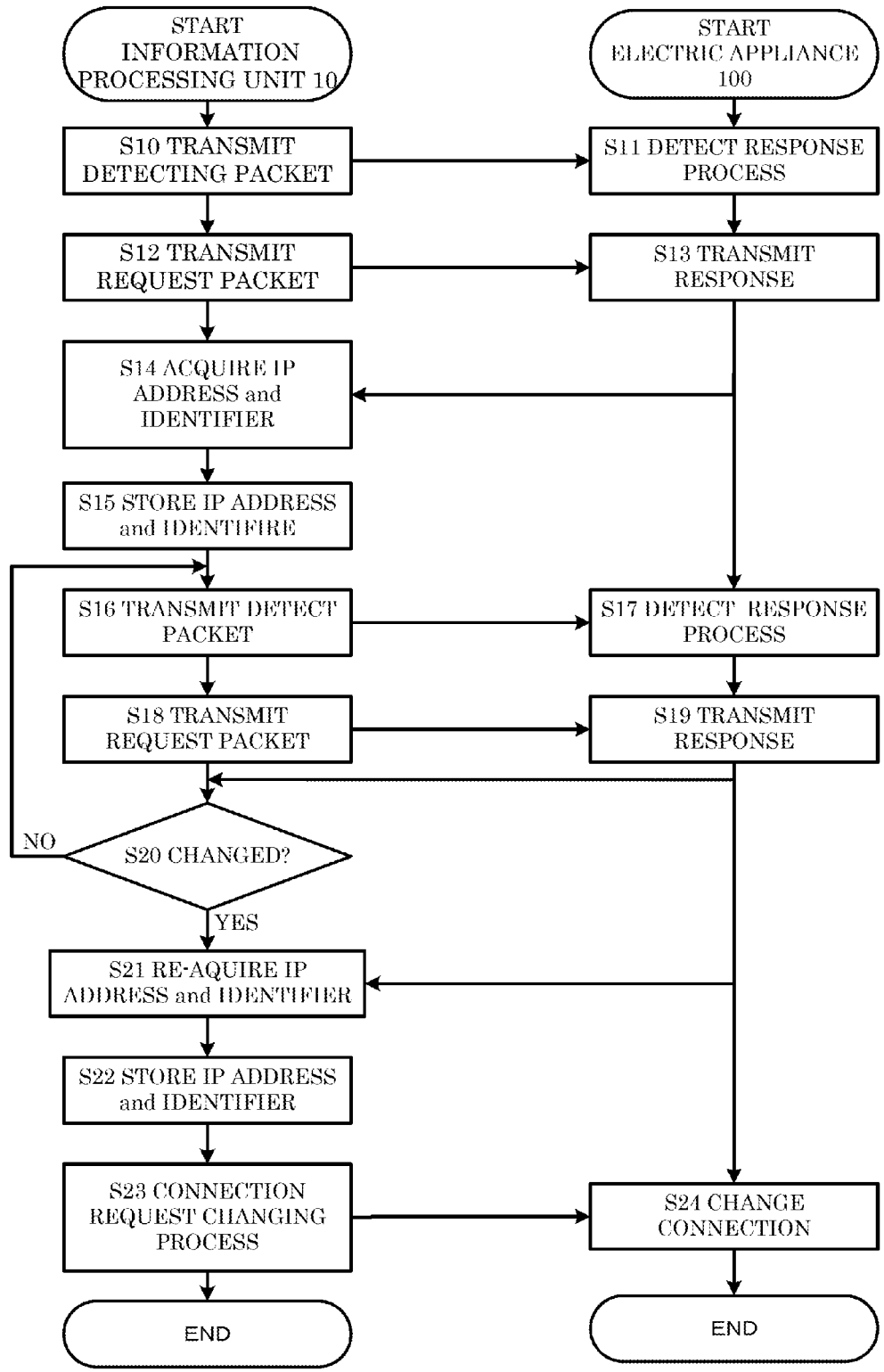
FIG. 3 is a flowchart of a connection configuration process performed by the information process device 10 and the electric appliance 100.

FIG. 2 shows functional block diagram of the information process device 10 and the electric appliance 100 to show the relationship among the functions.

The information process device 10 is provided with a control unit 11 equipped with central process unit (CPU), random access memory (RAM), read only memory (ROM), etc., and a communication unit 12 equipped with devices such as a wireless device conforming to the IEEE 802.11 standard for Wi-Fi®, or the IMT-2000 standard for the third generation, the IMT-Advanced for the fourth generation mobile communication system, and optionally a wired device for LAN.

In addition, the information process device 10 is provided with a memory unit 13 equipped with a data storage unit such as a hard disk and a semiconductor memory.

The memory unit 13 of the information process device 10 stores an IP association table described later.

In the information process device 10, the control unit 11 reads a predetermined program and runs an electric appliance detecting module 20 and a connection changing module 21, in cooperation with the communication unit 12. And also in the information process device 10, the control unit 11 reads a predetermined program and runs association information acquiring module 30 in cooperation with the memory unit 13.

In the same way as the information process device 10, the electric appliance 100 is provided with CPU, RAM, ROM, etc. as the control unit 110, and a Wi-Fi-enabled device conforming to IEEE 802.11, the third or the fourth generation mobile communication system conforming to Harmonized Standards for IMT-2000, etc. (a wired LAN connection is acceptable) as the communication unit 120. In addition, the electric appliance 100 may be provided with a data storage unit such as a hard disk or semiconductor memory device as a memory unit.

Furthermore, the electric appliance 100 may be provided with input/output unit, and also a touch panel or a keyboard or a mouse, etc. to receive input from a user.

In the electric appliance 100, the control unit 110 runs a connection module 200, by reading a predetermined program and in cooperation with the communication unit 120.

Connection Configuration Process

A connection configuration process executed by the information process device 10 and the electric appliance 100 will be described below with the process executed by each module. The information process device 10 transmits and receives the predetermined packet and executes each program, based on the model name-related information on the electric appliance 100 and the information relating to the model name relating information of the electric appliance 100. Furthermore, the model name relating information identifies the type of the electric appliance 100 such as the model name, the manufacturer's name, of the electric appliance 100.

The electric appliance detecting module 20 of the information process device 10 transmits a detecting packet to the electric appliance 100 (step 10).

A detecting packet may be transmitted from a command software utility such as Ping. The connection module of each electric appliance 100 receives a detecting packet and executes a detecting packet responding process by responding a detecting packet and transmitting an IP address to the transmitted packet (step 11).

The information process device 10 repeats the above-mentioned process until detecting an electric appliance 100.

After detecting the electric appliance 100, the electric appliance detecting module 20 of the information process device 10 transmits a request packet to the detected electric appliance 100 (step 12). The request packet is to allow the information process device 100 to determine the model name relating information, etc. of the electric appliance 100.

The request packet may be command data of address resolution protocol (ARP), network statistics (NETSTAT), Internet control message protocol (ICMP), simple network management protocol (SNMP), Universal Plug and Play (uPnP) and other protocols conforming to Digital Living Network Alliance (DLNA) guidelines.

The connection module 200 of the electric appliance 100 transmits a response packet in response to a transmitted request packet (step 13). For example, media access control address (MAC address) is transmitted as a response to ARP command. In addition, the port number in use and the port usage for TCP/IP are supplied by using NETSTAT commands.

The electric appliance detecting module 20 of the information process device 10 determines the model name relating information and the MAC address of the electric appliance 100 which received the request packets, based on these request packets. The model name relating information is determined by scoring a response packet. The MAC address is determined from a response packet.

As an example, how to determine whether the model name relating information of the electric appliance 100 is the model name A or B will be described. Response packets and points associated with each model name are stored in a definition file. For example, the definition file of the model name A defines that the response packet to the request packet (NESTAT) is "TCP port number 5000 is used". In the case of receiving this response packet is received, 1 point is scored. And if a different response packet is received, 0 point is scored. The definition file also defines points for other request packets (ARP, etc.). The points of each response packet received from the electric appliance 100 are scored based on the definition files A and B, and then the model name with the higher score is determined as the model name relating information.

The definition file defines, for example, if the model name is A, and the response packet to the request packet (NESTAT) is "TCP port number 5000 is used", then 1 point is scored, and if the different response packet is received, 0 point is scored. If the model name is B, and the response packet to the request packet (NESTAT) is "TCP port number 5000 is not used", then 1 point is scored, and if the different response packet is received, 0 point is scored.

In the case of receiving a response packet stating "TCP port number 5000 is used" from the connection module 200 of the electric appliance 100, the score of A is 0, and the score of B is 1. Thus model name B of the higher score is determined as the model name relating information. In this example model, name B is determined only by a NESTAT request packet, but other request packets (such as ARP) are also scored, and the total score of all the packets determined the model name.

Furthermore, the above-mentioned definition file may not be stored in the information process device 10, and may be stored in a server communicable with the information process device 10. Then, and the information process device 10 may request the model name relating information to this particular server by transmitting a response packet received from the electric appliance 100. In this case, the server determines the model name relating information in response to the request. And the electric appliance detecting module 20 of the information process device 10 transmits the model name relating information determined by the server and executes the following processes. And the above-mentioned definition file may not be stored in the information process device 100b, and may be stored in another electric appliance 100 a communicable with the information process device 10, and the information process device 10 may request the model name relating information from electric appliance 100 a by transmitting a response packet received from the electric appliance 100 b. In this case, the electric appliance 100a may determine the model name relating information in answer to demands. And the electric appliance detecting module 20 of the information process device 10 may transmit the model name relating information determined by the electric appliance 100 and execute the following processes.

Furthermore, as above-mentioned, the electric appliance detecting module 20 of the information process device 10 preferably determines the model name relating information by scoring request packets of more than one protocol but the request packet may be commands such as Internet control message protocol (ICMP) and simple network management protocol (SNMP) and the electric appliance detecting module 20 may transmit universal plug and play (uPnP) and determine the model name relating information only by the response packet to them.

In the above-mentioned way, the electric appliance detecting module 20 of the information process device 10 transmits the IP address and the identifier of the electric appliance 100 (step 14). Furthermore, in the present invention, "identifier" means the model name relating information, MAC address or unique ID which will be described below.

At the step 14, a unique ID acquired by the information process device 10 is to identify the electric appliance 100 which is assigned by the user input. This unique ID may be assigned by user input to the input part of the electric appliance 100, may be generated based on the model name relating information and assigned, and may be by direct input to the information process device 10.

The association information acquiring module 30 of the information process device 10 stores the transmitted IP address and identifier correlating each other in a memory unit 13 (step 15). At the step 15, the association information acquiring module 30 of the information process device 10 stores IP addresses and identifiers in the format of the first association table shown on FIG. 4.

The First Association Table

The first association table shown on FIG. 4 associates and stores the IP address (the pseudo IP address and the present addresses) with the MAC address and the unique ID. In this first association table, the pseudo IP address and the present address of the electric appliance present detected this time are "192.168.1.4", the MAC address is "33:55:0a:99:0b" and the unique ID is "electric appliance XXXX".

In the first association table, the pseudo IP address and the present address are the IP address of the electric appliance 100 acquired by the information process device at the step 14. The MAC address is the MAC address of the electric appliance 100 acquired by the information process device 10 at the step 14. And the unique ID has been acquired by the information process device 10 also at the step 14.

Furthermore, the first association table may be stored not in the information process device 10 but may be stored by the electric appliance 100. In this case, the association information acquiring module 30 of the information process device 10 may execute the process associate and store the pseudo IP address and the present IP address, the MAC address, the unique ID with each other in the electric appliance 100. In addition, though in this embodiment of the present invention, the first association table stores the information of a single electric appliance, but may store information of plural electric appliances.

In the next place, the electric appliance detecting module 20 of the information process device 10 re-transmits a detecting packet to the electric appliance 100 (step 16). The process of the step 16 is the same as that of the above-mentioned step 10. The connection module 200 of the electric appliance 100 receives the detecting packet, executes the detection responding process by responding the IP address to the received packet (step 17). The process of the step 17 is the same as the above-mentioned step 11.

After detecting of the electric appliance 100, the electric appliance detecting module 20 of the information process device 10, transmits a request packet to the detected electric appliance 100. The process of the step 18 is the same as the above-mentioned step 12.

The connection module 200 of the electric appliance 100 transmits the response packet to the transmitted request packet (step 19). The process of the step 19 is the same as the above-mentioned step 13.

The electric appliance detecting module 20 of the information process device 10 determines whether the IP address of the electric appliance 100 is redirected or not (step 18). At the step 18, the electric appliance detecting module 20 of the information process device 10 determines whether the IP address acquired by the connection module 200 of the each electric appliance 100 is the same as the IP address transmitted at the step 11. At the step 20, if the electric appliance detecting module 20 determines that the IP address transmitted this time is the same as the IP address transmitted at the step 11 and the MAC address or the unique ID is not redirected, the electric appliance 100 determines that the IP address is not redirected (step 20, "NO"), and repeats the process of steps from 16 to 20.

At the step 20, if the electric appliance detecting module 20 determines that the IP address transmitted this time is different from that transmitted at the step 11, and the MAC address or the unique ID is the same, the electric appliance 100 determines that the IP address is redirected (step 20 "YES").

In the next place, the electric appliance detecting module 20 of the information process device 10 re-transmits the IP address and the identifier transmitted from the connection module 200 of the electric appliance 100 (step 21). The process of the step 21 is the same as the above-mentioned step 14.

The association information acquiring module 30 of the information process device 10 stores the re-transmitted IP address and the re-transmitted identifier correlating each other in the memory unit 13 (step 22). At the step 22, the association information acquiring module 30 of the information process device 10 stores the previous IP address and the re-transmitted identifier correlating each other in the format of the second association table shown on FIG. 5.

The Second Association Table

The second association table shown on FIG. 5 is the data stored in the information process device 10, consisting of IP address (the pseudo IP address), the MAC address, the unique ID that have been stored at the step 15 and re-transmitted IP address (the present address) transmitted at the step 21, made to correlate one another. In the second association table, the pseudo IP address is "192.168.1.4", the present address is "192.168.1.8", the MAC address is "33:55:0a:99:0b", the unique ID is (XXXX electric appliance).

In the second association table, the pseudo IP address is the IP address of the electric appliance 100 transmitted at the step 14. And the present address is the re-transmitted IP address of the electric appliance 100 transmitted at the step 21. And the MAC address is the MAC address of the electric appliance 100 transmitted at the step 14. And the unique ID is the unique ID of the electric appliance 100 also transmitted at the step 14.

That is to say, the second association table is the same as the first association table, except that the value of the present address in the first association table is and overwritten with the re-transmitted value at the step 21.

Furthermore, the second association table may be stored not in the information process device 10 but may be stored in the electric appliance 100 as in the case of the first association table. In this case, the association information acquiring module 30 of the information process device 10 should execute the process to store the pseudo IP address, the present address, the a MAC address and the unique ID that have been transmitted from the electric appliance making to correlate one another, in the electric appliance 100.

In addition, though in this embodiment of the present invention, the second association table shows only the information of a single electric appliance, information of plural electric appliances may be shown.

In the next place, the connection changing module 21 of the information process device 10 executes connection redirecting request process for the information process device 100 (step 23).

Connection Request Redirecting Process

At the step 23, in the case that a connection request is transmitted to the re-transmitted electric appliance 100, the information process device 10 process determines the connection request to the pseudo IP address as the connection request to the present address correlated to this pseudo IP address and executes connection changing process. That is to say, the IP address of the electric appliance 100 transmitted when the electric appliance 100 is connected to the network for the first time is utilized as the pseudo IP address and the re-transmitted address as the present IP address.

When the information process device 10 receives a connection request for the electric appliance 100a, it compares the present IP address with the IP address to which connection request is made. Here the IP address to which the connection request is transmitted is the pseudo IP address acquired by the electric appliance 100a for the first time and the re-transmitted IP address is the present address. When the information process device 10 receives the connection request for the electric appliance 100a, it looks up the pseudo IP address, the present address, the MAC address and the unique ID of the electric appliance 100*a*. The information process device 10 determines whether the connection request is for the electric appliance 100*a* by whether or not the MAC address or the unique ID is redirected. Here if the MAC address or the unique ID of the electric appliance 100*a* to which the connection request is executed is the same, the information process device 10 executes connection redirecting request process. And if not, the information process device 10 does not connect to the electric appliance 100.

If the MAC address or the unique identifier of the electric appliance 100 is the same, the information process device 10 transmits the pseudo IP address and the present address that associated to the MAC address or the unique ID. Here If the IP address executing connection request to the electric appliance 100 is the pseudo IP address received for the first time, the information process device 10 redirects this connection request from the pseudo IP address to the re-transmitted present address, and connects process to the electric appliance 100.

Here, for instance, a case that a printing request to a printer is executed will be explained with reference to the second association table shown on FIG. 5. That is to say, by way of example, processing redirected from the IP address "192.168.1.4" of the printer to the IP address "192.168.1.8".

When a printing request is transmitted from another electric appliance 100 to the printer, the information process device 10 receives a connection request between the printer and the electric appliance 100. At this moment, though the present IP address of the printer is "192.168.1.8", the electric appliance 100 executes the connection request for the previous IP address of the printer "198.168.1.4" and the MAC address "33:55:0a:99:0b" or the unique ID "XXXX electric appliance". Here the information process device 10 determines that the connection request has been transmitted from the electric appliance 100 as the MAC address or the unique ID. And the information process device 10 determines the present address based on the MAC address or the unique ID. Thereafter the information process device 10 redirects the connection request from the pseudo IP address "198.168.1.4" to the present address "192.168.1.8", and executes the connecting process between the printer and the electric appliance 100. Thereby, the printer performs the specific printing in response to the printing request from the electric appliance 100.

At the step 23, the electric appliance 100 process connects to the redirected destination (step 24).

This embodiment of the present invention uses two tables, that is, the first association table and the second association table but may use only one table. In this case, the above-mentioned process is executed by rewriting the present address with the re-transmitted IP address.

Thus, even if the IP address of the electric appliance is redirected, the destination can be redirected possible based on the pseudo IP address, the present address, the MAC address and the unique ID to enhance the user-friendliness.

To achieve the above-mentioned means and functions, a computer (including CPU, information process device, and various terminals) reads and executes the predetermined programs.

Programs are provided in the form recorded in a computer readable recording medium such as a flexible disk, CD (CD-ROM), or DVD (DVD-ROM, DVD-RAM).

In this case, a computer reads the programs from the recording medium and forwards to and stores in an internal memory unit or an external memory unit, and executes them.

The programs may be recorded beforehand in a storage device (recording medium) such as a magnetic disk, an optical disk, or a magneto-optical disk and may be provided from the storage unit to a computer via communication line.

Although embodiments of the present invention have been described above, the present invention is not limited to these embodiments. In addition, the effects described in the explanation of embodiments of the present invention merely illustrate the most preferable effects resulting from the present invention, and the effects according to the present invention are not limited to those described in the embodiments of the present invention.

1 PROGRAM EXECUTING SYSTEM
3 PUBLIC LINE NETWORK
10 INFORMATION PROCESS DEVICE
100 ELECTRIC APPLIANCE

What is claimed is:

1. An information process device executing a predetermined process in response to a connection of an electric appliance with a network, comprising:
    a processor;
    a communication unit; and
    a memory unit,
    wherein the processor, in cooperation with the communication unit, executes:
    an electric appliance detecting module detecting a connection of the electric appliance to a network; and
    an IP address acquiring module acquiring an IP address of the detected electric appliance,
    wherein the processor, in cooperation with the memory unit, executes an associated information acquiring module acquiring association information associating the IP address with an identifier identifying the electric appliance, and
    wherein the processor, in cooperation with the communication unit, executes:
    an electric appliance re-detecting module re-detecting a connection of the electric appliance to the network;
    an IP address re-acquiring module re-acquiring an IP address of the redetected electric appliance; and
    a connection request redirecting module redirecting a connection request from to an IP address associated with the identifier to the re-acquired IP address based on the acquired association information.

2. The information process device according to claim 1, wherein the association information acquiring module acquires the IP address acquired by the IP address acquiring module as a pseudo IP address and the IP address re-acquired by the IP address re-acquiring module as a present IP address.

3. The information process device according to claim 1, wherein the identifier acquired by the association information acquiring module is a MAC address.

4. The information process device according to claim 1, wherein the identifier acquired by the association information acquiring module is a unique ID arbitrarily assigned by a user.

5. An information process method of executing a predetermined process in response to a connection of an electric appliance with a network, comprising the steps of:
    detecting a connection of the electric appliance to a network;
    acquiring an IP address of the detected electric appliance;
    acquiring association information associating the IP address with an identifier identifying the electric appliance;

re-detecting a connection of the electric appliance to a network;

re-acquiring an IP address of the re-detected electric appliance; and redirecting a connection request to an IP address associated with the identifier to the re-acquired IP address based on the acquired association information.

6. A program product for use in an information process device comprising a non-transitory computer usable medium having a set of instructions physically embodied therein, the set of instructions including computer readable code, which when executed by an information process device executing a predetermined process in response to a connection of an electric appliance with a network causes the information process unit to:

detect a connection of the electric appliance to a network;

acquire an IP address of the detected electric appliance;

acquire association information associating the IP address with an identifier identifying the electric appliance;

re-detect a connection of the electric appliance to the network;

re-acquire an IP address of the re-detected electric appliance;

redirect a connection request to an IP address associated with the identifier to the re-acquired IP address based on the acquired association information.

\* \* \* \* \*